(12) United States Patent
Ichijo et al.

(10) Patent No.: US 9,353,830 B2
(45) Date of Patent: May 31, 2016

(54) LINK-PLATE CHAIN FOR CONTINUOUSLY VARIABLE TRANSMISSION

(71) Applicant: HONDA MOTOR CO., LTD., Tokyo (JP)

(72) Inventors: Shuji Ichijo, Wako (JP); Takashi Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/645,653

(22) Filed: Mar. 12, 2015

(65) Prior Publication Data

US 2015/0267775 A1 Sep. 24, 2015

(30) Foreign Application Priority Data

Mar. 24, 2014 (JP) ................................. 2014-059722

(51) Int. Cl.
*F16H 7/14* (2006.01)
*F16G 13/08* (2006.01)

(52) U.S. Cl.
CPC ...................................... *F16G 13/08* (2013.01)

(58) Field of Classification Search
CPC ............. F16G 5/18; F16G 13/04; F16G 5/16; F16H 9/24; B21L 15/005
USPC .......................... 474/215, 216, 217, 241, 242
See application file for complete search history.

(56) References Cited

U.S. PATENT DOCUMENTS 2,067,243 A * 1/1937 Perry ...................... F16G 13/04
474/215
2,324,640 A * 7/1943 Perry ...................... F16G 13/04
474/215

(Continued)

FOREIGN PATENT DOCUMENTS

JP 4780368 B2 9/2011

*Primary Examiner* — Henry Liu
(74) *Attorney, Agent, or Firm* — Westerman, Hattori, Daniels & Adrian, LLP

(57) ABSTRACT

A link-plate chain for a continuously variable transmission, having a plurality of link plates interconnected in a chain circumferential direction and a chain transverse direction to be wound around an input pulley and an output pulley, by a plurality of rocker pins inserted to extend in the traverse direction through pin holes formed in the link plates, and attached with retainer pins for preventing detachment of the link plates from the rocker pins at ends in the transverse direction of the rocker pins, wherein: the retainer pins of the inside rocker pins sandwiched between the outer side rocker pins in the longitudinal direction among the rocker pins inserted through the link plates located at outermost ends in the transverse direction are configured to be attached more outward in the transverse direction than the retainer pins of the front and rear end side rocker pins.

5 Claims, 4 Drawing Sheets

(56) References Cited

U.S. PATENT DOCUMENTS

| | | | | |
|---|---|---|---|---|
| 3,916,709 A * | 11/1975 | Steuer | F16H 9/24 | 474/201 |
| 4,580,999 A * | 4/1986 | Ledford | F16G 5/18 | 474/201 |
| 4,622,025 A * | 11/1986 | Kern | F16G 5/18 | 474/242 |
| 4,650,445 A * | 3/1987 | Mott | F16G 5/18 | 474/201 |
| 4,666,421 A * | 5/1987 | Honda | F16G 5/18 | 474/242 |
| 4,710,154 A * | 12/1987 | Rattunde | F16H 9/24 | 474/201 |
| 4,911,682 A * | 3/1990 | Ivey | F16G 5/18 | 474/215 |
| 4,936,813 A * | 6/1990 | Ohzono | F16H 9/24 | 474/242 |
| 4,938,737 A * | 7/1990 | Yamamuro | F16G 5/18 | 474/242 |
| 5,007,883 A * | 4/1991 | Cole, Jr. | F16G 5/18 | 474/242 |
| 5,026,332 A * | 6/1991 | Mott | F16G 5/18 | 474/242 |
| 5,439,423 A * | 8/1995 | Okuwaki | F16G 5/18 | 474/242 |
| 6,142,903 A * | 11/2000 | Heinrich | F16G 5/18 | 474/215 |
| 6,299,559 B1 * | 10/2001 | Friedmann | F16G 5/18 | 474/213 |
| 6,346,058 B1 * | 2/2002 | Linnenbrugger | F16G 5/18 | 474/212 |
| 6,406,396 B1 * | 6/2002 | Turner | F16G 5/18 | 474/206 |
| 6,527,657 B2 * | 3/2003 | Sakakibara | F16G 5/18 | 474/242 |
| 6,539,700 B2 * | 4/2003 | Linnenbrugger | B21L 9/065 | 474/219 |
| 6,558,281 B1 * | 5/2003 | Greiter | B21L 15/005 | 474/219 |
| 6,811,507 B2 * | 11/2004 | Baumann | B21L 15/005 | 148/206 |
| 7,179,184 B2 * | 2/2007 | Linnenbrugger | F16G 13/06 | 229/207 |
| 7,204,775 B2 * | 4/2007 | Teubert | F16G 5/18 | 474/206 |
| 7,967,710 B2 * | 6/2011 | Krause | F16G 5/18 | 474/206 |
| 7,993,229 B2 * | 8/2011 | Kamamoto | F16G 5/18 | 474/215 |
| 2001/0019979 A1 * | 9/2001 | Wakabayashi | F16G 5/18 | 474/245 |
| 2002/0077205 A1 * | 6/2002 | Turner | F16G 5/18 | 474/242 |
| 2003/0186767 A1 * | 10/2003 | Greiter | B21L 15/005 | 474/215 |
| 2004/0248682 A1 * | 12/2004 | Wagner | F16G 5/18 | 474/215 |
| 2007/0087881 A1 * | 4/2007 | Baumann | F16G 5/18 | 474/215 |
| 2007/0149331 A1 * | 6/2007 | Yasuhara | F16G 5/18 | 474/215 |

* cited by examiner

LINK-PLATE CHAIN FOR CONTINUOUSLY VARIABLE TRANSMISSION

BACKGROUND

1. Technical Field

This invention relates to a link-plate chain for a continuously variable transmission.

2. Background Art

With respect to the link-plate chain for a continuously variable transmission, various techniques have been developed for preventing detachment of the chain's link plates and rocker pins. An example of such a technique can be found in Patent Document 1 (Japanese Patent No. 4780368).

Patent Document 1 is configured to prevent detachment of link plates and rocker pins from a link-plate chain (sometimes called simply "chain" in the following) by, for example, fastening retainer pins at end peripheral surfaces of rocker pins passed through link plates, and either fitting a projection formed on a rolling surface of one rocker pin of each pair of rocker pins into a notch formed on a rolling surface of the other rocker pin, or attaching position fixing members to the link plates for restricting movement of the rocker pins in a chain transverse direction.

SUMMARY

However, the technique of Patent Document 1 has drawbacks due to structural complication and the like resulting from, inter alia, the need to form the projections and notches on the rolling surfaces, and to utilize the position fixing members.

Moreover, as shown in FIG. 5, all of the retainer pins attached to the aforesaid rocker pins can conceivably be attached substantially equidistant from the link plates in the chain transverse direction. But with this configuration, among the retainer pins of the four rocker pins inserted in the outermost link plates located farthest to the outside in the chain transvers direction, those retainer pins of the inner two rocker pins that rock during chain bending repeatedly contact the link plates at every rocking, giving rise to a danger of the retainer pins attached to the inside rocker pins detaching owing to, for example, peeling of welds between the retainer pins and the rocker pins.

Therefore, an object of this invention is to overcome the aforesaid problem by providing a link-plate chain for a continuously variable transmission which, while being of simple structure, is configured to prevent retainer pin detachment caused by rocker pin rocking.

In order to achieve the object, this invention provides a link-plate chain (30) for a continuously variable transmission (10), having a plurality of link plates (30$a$) interconnected in a longitudinal direction (chain circumferential direction) and a transverse direction (chain transverse direction) to be wound around an input pulley (24) and an output pulley (26), by a plurality of rocker pins (30$b$) inserted to extend in the traverse direction through pin holes (30$a$1) formed in the link plates, and attached with retainer pins (30$c$) for preventing detachment of the link plates from the rocker pins at ends in the transverse direction of the rocker pins (near ends; specifically, peripheral surfaces of rocker pins 30$b$ inserted through outermost link plates 30$a$), wherein: the retainer pins (30$c$2, 30$c$3) of the inside rocker pins (second, third rocker pins 30$b$2, 30$b$3) sandwiched between the front and rear end side (outside) rocker pins (first, fourth rocker pins 30$b$1, 30$b$4) in the longitudinal direction among the rocker pins (first to fourth rocker pins 30$b$1, 30$b$2, 30$b$3, 30$b$4) inserted through the link plates (30$a$) located at outermost ends in the transverse direction are configured to be attached more outward in the transverse direction than the retainer pins (30$c$1 30$c$4) of the front and rear end side rocker pins.

BRIEF DESCRIPTION OF THE DRAWINGS

The above and other objects and advantages of an embodiment of this invention will be more apparent from the following description and drawings in which.

DESCRIPTION OF EMBODIMENT

An embodiment for implementing the link-plate chain for a continuously variable transmission according to this invention is explained with reference to the attached drawings in the following.

Figure 1:
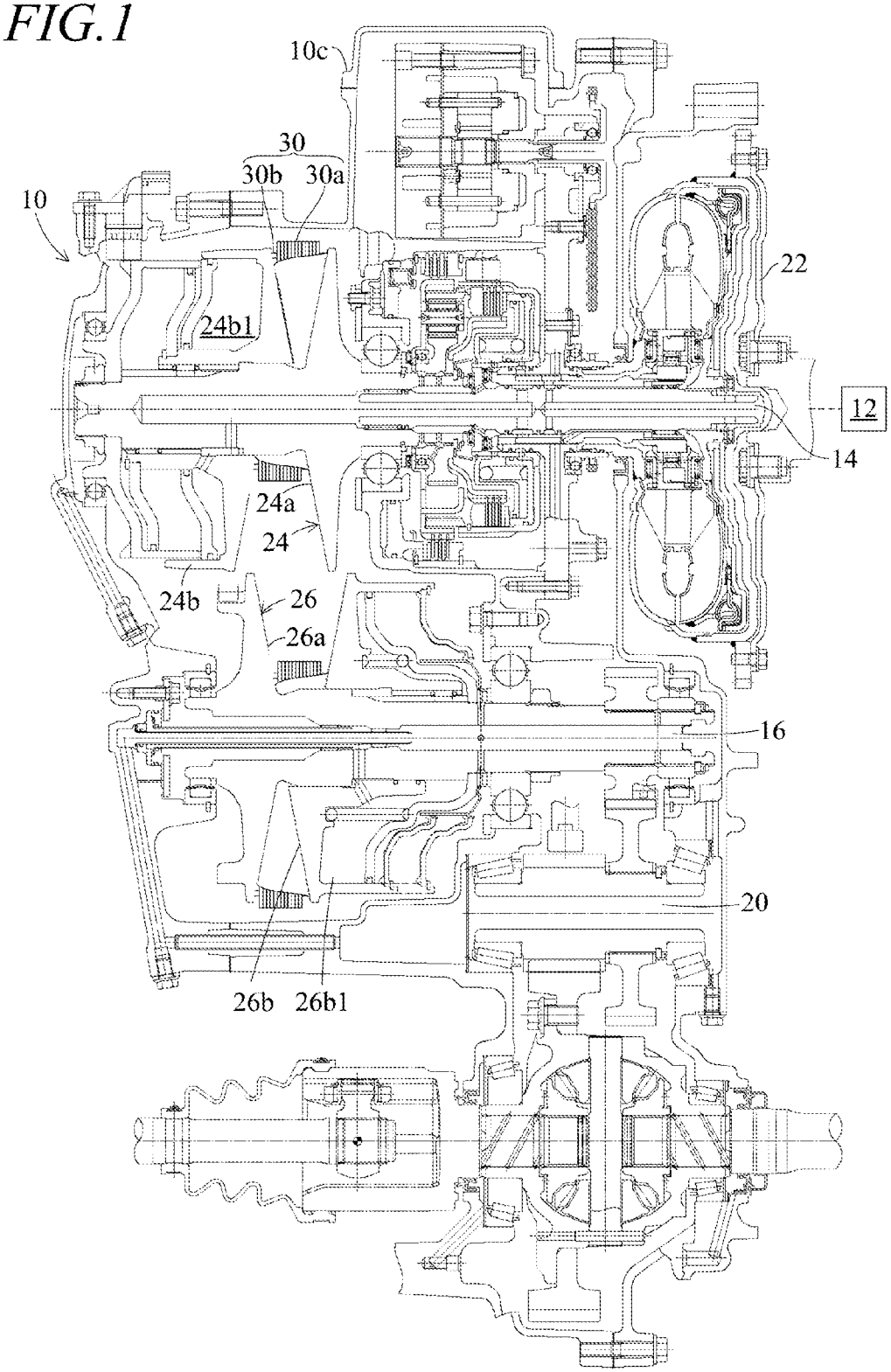
FIG. 1 is a cross-sectional view of a continuously variable transmission including a link-plate chain for a continuously variable transmission according to an embodiment of this invention.
Figure 2:
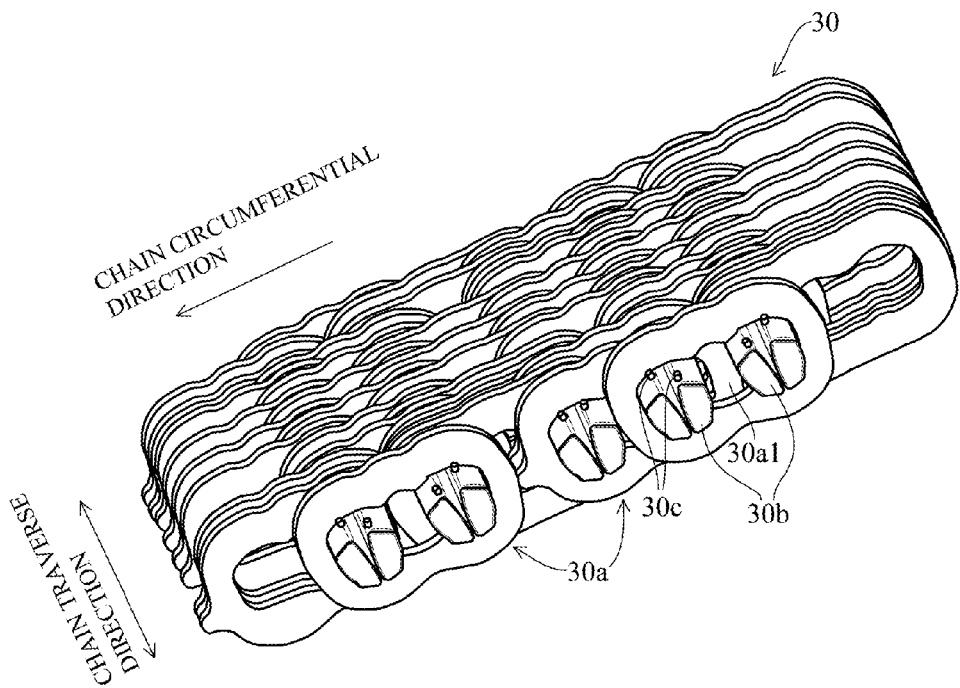
FIG. 2 is a partial perspective view of the link-plate chain shown in FIG. 1.
Figure 3:
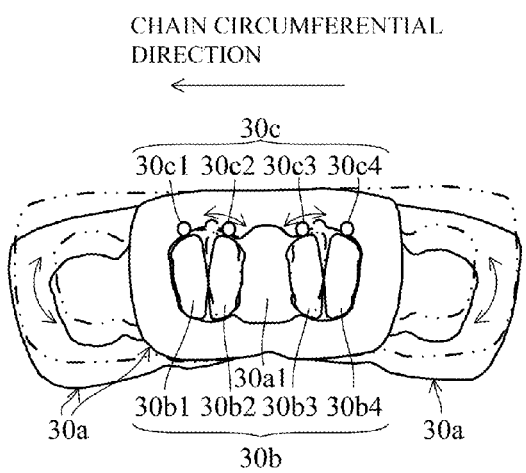
FIG. 3 is an explanatory view for explaining bending motion of the link-plate chain shown in FIG. 2.
Figure 4:
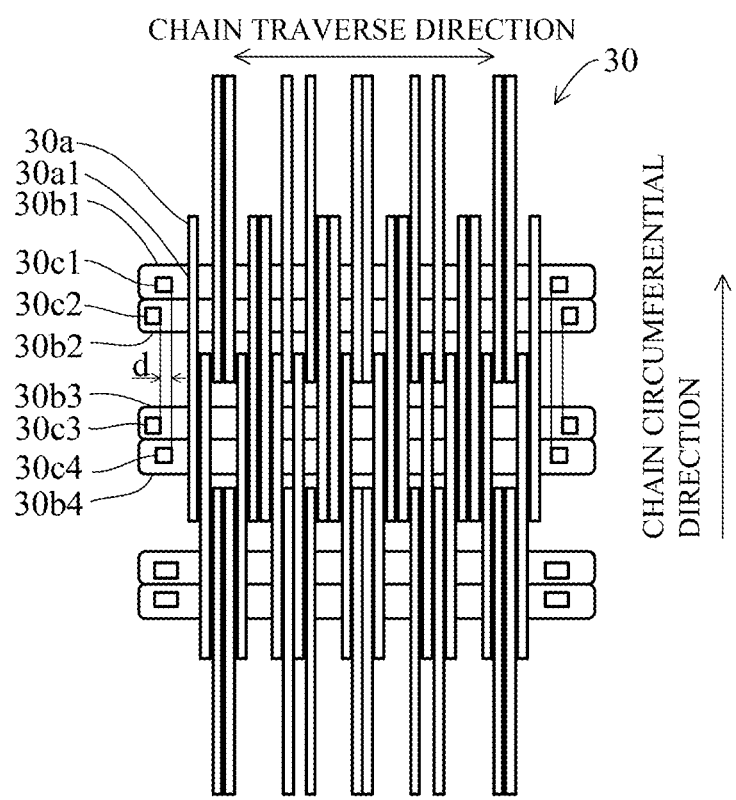
FIG. 4 is a partial plan view of the link-plate chain shown in FIG. 2.

FIG. 1 is a cross-sectional view of a continuously variable transmission including a link-plate chain for a continuously variable transmission according to an embodiment of this invention; FIG. 2 is a partial perspective view of the link-plate chain shown in FIG. 1; FIG. 3 is an explanatory view for explaining bending motion of the link-plate chain shown in FIG. 2; and FIG. 4 is a partial plan view of the link-plate chain shown in FIG. 2.

Symbol 10 in FIG. 1 designates a chain-type continuously variable transmission. The continuously variable transmission 10 is mounted on a vehicle (not shown) and varies the speed of rotation transmitted to left and right drive wheels (not shown) from an engine or other power source 12.

The continuously variable transmission 10 is equipped with an input shaft 14, an output shaft 16, and an intermediate shaft 20, which are aligned in parallel with one another. The output of the power source 12 is inputted from the input shaft 14 through a torque converter 22.

The continuously variable transmission 10 comprises an input pulley (drive pulley) 24 installed on the input shaft 14, an output pulley (driven pulley) 26 installed on the output shaft 16, and a metal chain (endless chain belt; link-plate chain) 30 wound around the pulleys. The input pulley 24 and output pulley 26 each comprises a pair of facing disks (sheaves).

The input pulley 24 comprises a fixed side input pulley half 24$a$ installed to be non-rotatable and axially non-movable relative to the input shaft 14 and a movable side input pulley half 24$b$ installed to be non-rotatable relative to the input shaft 14 and axially movable with respect to the fixed side input pulley half 24$a$.

The output pulley 26 comprises a fixed side output pulley half 26$a$ installed to be non-rotatable and axially non-movable relative to the output shaft 16 and a movable side output pulley half 26$b$ installed to be non-rotatable relative to the output shaft 16 and axially movable with respect to the fixed side output pulley half 26$a$.

The movable side input pulley half 24b and movable side output pulley half 26b are provided with piston chambers 24b1 and 26b1. The movable side input pulley half 24b and movable side output pulley half 26b approach and depart from the fixed side input pulley half 24a and the fixed side output pulley half 26a in response to the pressure of hydraulic oil (hydraulic pressure) supplied to the piston chambers 24b1 and 26b1.

A chain 30 is wound around the input pulley 24 and output pulley 26. As shown in FIG. 2, the chain 30 comprises a plurality of link plates 30a connected in a longitudinal direction (corresponding to a circumferential direction of the chain 30; hereinafter called "chain circumferential direction") and a transverse direction orthogonal to the chain circumferential direction (corresponding to the transverse direction of the chain 30; hereinafter called "chain transverse direction").

The plurality of link plates 30a are connected by a plurality of rocker pins 30b inserted into (passed through) pin holes 30a1 formed in the link plates 30a. The opposite ends of the rocker pins 30b passing through the link plates 30a are formed so as to contact the disks (sheaves) of the input pulley 24 and output pulley 26 (see FIG. 1), and when the input pulley 24 is rotated, the force thereof is transmitted to the output pulley 26 through the rocker pins 30b and the link plates 30a.

Two pairs of rocker pins 30b are inserted through the pin hole 30a1 of each link plate 30a (i.e., four rocker pins 30b are inserted through the link plate 30a in two pairs), and a configuration is adopted that enables relative rolling motion by rolling contact of the facing surfaces (rolling surfaces) of one pair of rocker pins 30b.

Specifically, as shown in FIG. 3, where the four rocker pins 30b1 to 30b4 passed through a link plate 30a located at an outermost edge in the chain transverse direction (hereinafter called simply "outermost edge"; the link plate shown at the center of the drawing) are designated first rocker pin 30b1, second rocker pin 30b2, third rocker pin 30b3 and fourth rocker pin 30b4 in order of deployment in the chain circumferential direction (from the left side in the drawing), the first and fourth rocker pins 30b1 and 30b4 deployed at the front and rear ends (outside) of the pin hole 30a1 in the chain circumferential direction are pressure fitted in the pin hole 30a1 to be non-rockable (i.e., to be fixed to the pin hole 30a1). Further, the second and third rocker pins 30b2 and 30b3 deployed inside the first and fourth rocker pins 30b1 and 30b4 are passed through to be rockable in the pin hole 30a1 as indicated by arrows in the drawing.

On the other hand, the outside first and fourth rocker pins 30b1 and 30b4 fixed to the pin hole 30a1 of the outermost link plate 30a come to be rockable rocker pins 30b respectively deployed at the inside of adjacent link plates 30a (link plates 30a located immediately to the left and right of the link plate at the outermost edge), while the inside second and third rocker pins 30b2 and 30b3 rockably passed through the pin hole 30a1 of the outermost link plate 30a come to be non-rockable pins 30b respectively deployed at the outside of the adjacent link plates 30a.

Therefore, as distinctly shown in FIG. 3, adjacent link plates 30a are configured to bend by rotating relative to one another during bending motion of the chain 30. The chain 30 is thus configured to be bendable and endless as a so-called chain belt.

Returning to the explanation of FIG. 2, a retainer pin 30c is attached to each of the opposite ends of each rocker pin 30b (only the end on one side shown in FIG. 2) at the outer peripheral surface thereof so as to project in the outer radial direction of the chain 30. The retainer pins 30c are for preventing detachment of the link plates 30a from the rocker pins 30b and are fixed on the outer peripheral surfaces of the rocker pins 30b by welding.

Figure 5:
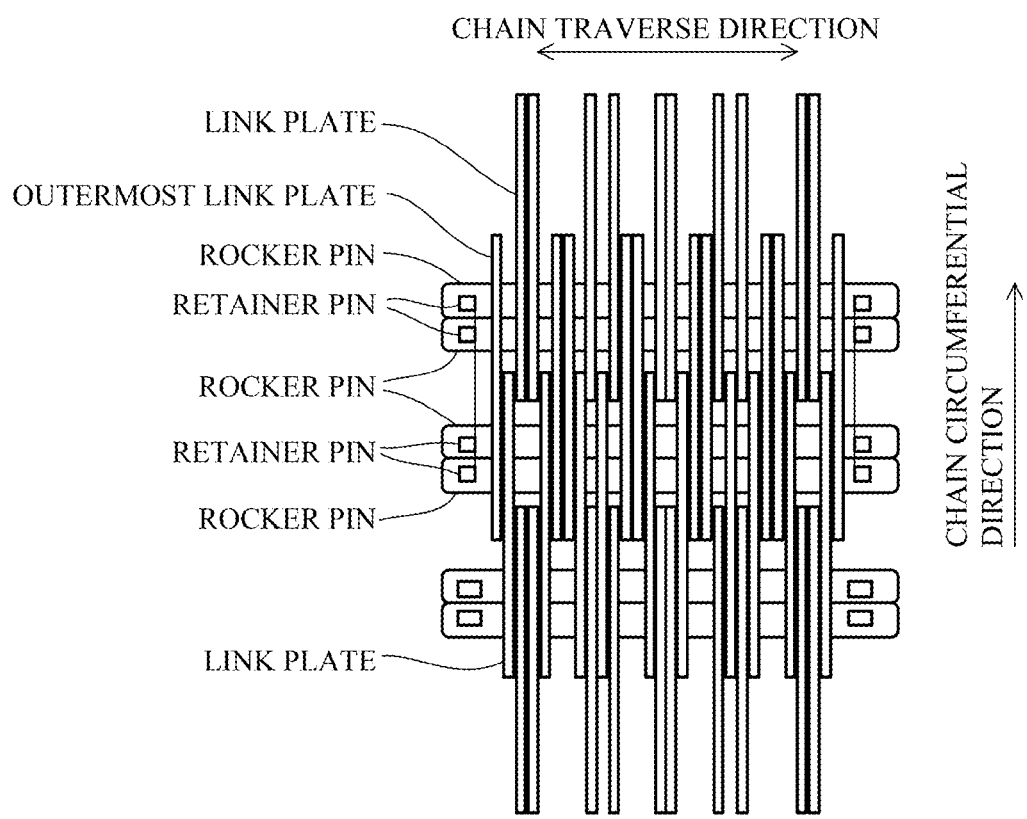
FIG. 5 is the same partial plan view of the link-plate chain as FIG. 4.

Further explanation of the retainer pin 30c here will be preceded by another explanation of the object of the present invention with reference to FIG. 5 touched on earlier. As shown in FIG. 5, the retainer pins attached to the four rocker pins (corresponding to the first to fourth rocker pins 30b1, 30b2, 30b3 and 30b4 of FIG. 3) inserted through the outermost link plates (corresponding to the outermost link plates 30a of FIG. 3) can conceivably all be attached substantially equidistant from the link plates in the chain transverse direction. In other words, every retainer pin can conceivably be deployed to be substantially the same distance from the outermost link plate in the chain transverse direction.

With this configuration, however, among the retainers of the four rocker pins inserted through the outermost link plates, those retainer pins of the inner two rocker pins that rock during chain bending (corresponding to the second and third rocker pins 30b2 and 30b3 of FIG. 3) repeatedly make contact with, inter alia, walls of the rocker pin or edges of the pin holes (corresponding to the pin holes 30a1) at every rocking (see FIG. 3), giving rise to a danger of the retainer pins attached to the inside rocker pins detaching owing to peeling of welds between the retainer pins and the rocker pins.

In this embodiment, therefore, as shown in FIG. 4, among the retainers of the first to fourth rocker pins 30b1, 30b2, 30b3 and 30b4 inserted through the outermost link plates 30a, the retainer pins 30c2 and 30c3 attached to the inside second and third rocker pins 30b2 and 30b3 rockable within the pin holes 30a1 are attached more outward in the chain transverse direction than the retainer pins 30c1 and 30c4 attached to the outside first and fourth rocker pins 30b1 and 30b4 fixed to the pin holes 30a1.

In other words, the retainer pins 30c2 and 30c3 of the inside second and third rocker pins 30b2 and 30b3 rockable within the pin holes 30a1 are attached to be spaced farther away (separated) from the walls of the outermost link plates 30a by a distance d than are the retainers 30c1 and 30c4 of the outside first and fourth rocker pins 30b1 and 30b4 fixed to the pin holes 30a1.

This keeps the retainer pins 30c2 and 30c3 of the inside second and third rocker pins 30b2 and 30b3 out of contact with the link plates 30a when the second and third rocker pins 30b2 and 30b3 rock with bending of the link plates 30a and thereby ensures that welds of the retainers 30c2 and 30c3 do not peel. As a result, detachment of the retainers 30c2 and 30c3 can be prevented and the durability of the rockable inside second and third rocker pins 30b2 and 30b3 can be greatly enhanced.

As stated above, the embodiment of this invention is configured to have a link-plate chain (30) for a continuously variable transmission (10), having a plurality of link plates (30a) interconnected in a longitudinal direction (chain circumferential direction) and a transverse direction (chain transverse direction) to be wound around an input pulley (24) and an output pulley (26), by a plurality of rocker pins (30b) inserted to extend in the traverse direction through pin holes (30a1) formed in the link plates, and attached with retainer pins (30c) for preventing detachment of the link plates from the rocker pins at ends in the transverse direction of the rocker pins (near ends; specifically, peripheral surfaces of rocker pins 30b inserted through outermost link plates 30a), wherein: the retainer pins (30c2, 30c3) of the inside rocker pins (second, third rocker pins 30b2, 30b3) sandwiched between the front and rear end side (outside) rocker pins (first, fourth rocker pins 30b1, 30b4) in the longitudinal direction among the rocker pins (first to fourth rocker pins 30b1, 30b2, 30b3, 30b4) inserted through the link plates (30a) located at outermost ends in the transverse direction are configured to be attached more outward in the transverse direction than the retainer pins (30c1 30c4) of the front and rear end side rocker pins.

Namely, it is configured so that the retainer pins of the inside rocker pins that rock during chain bending are configured to be attached more outward in the transverse direction than the retainer pins of the front and rear end side (outside) rocker pins that do not rock during chain bending, whereby the retainer pins of the inside rocker pins that rock do not contact the link plates when the rocker pins rock during chain bending.

It is therefore possible to prevent retainer pin detachment caused by, for example, peeling of a retainer pin weld owing to repeated contact of the retainer pin with the link plate. In addition, the prevention of retainer pin detachment ensures reliable prevention of link plate and rocker pin detachment. Moreover, the configuration is achieved merely by changing the position where the retainer pins of the inside rocker pins are attached, so that the structure is simple and requires no component machining or other measures for structural enhancement and no addition of new components.

In the link-plate chain, when the rocker pins inserted through the link plates located at the outermost ends in the traverse direction are defined as first, second, third, fourth rocker pins (30b1, 30b2, 30b3, 30b4) in deployment order in the longitudinal direction, the retainer pins (30c2, 30c3) of the inside second, third rocker pins are configured to be attached more outward in the transverse direction than the retainer pins (30c1 30c4) of the front and rear end side first, fourth rocker pins. With this, in addition to the effects and advantages mentioned above, it becomes possible to prevent detachment of the retainer pins (30c2, 30c3) more reliably.

In the link-plate chain, the inside second, third rocker pins (30b2, 30b3) are configured to be rockably inserted through the pin holes (30a1) formed in the link plates located at the outermost ends in the traverse direction. With this, in addition to the effects and advantages mentioned above, it becomes possible to prevent detachment of the retainer pins 30c (30c2, 30c3) more reliably.

In the link-plate chain, the inside second, third rocker pins (30b2, 30b3) are configured to be non-rockable respectively deployed at the front and rear end side of other link plates (30a) adjacent to the link plates located at the outermost ends in the traverse direction. With this, in addition to the effects and advantages mentioned above, it becomes possible to prevent detachment of the retainer pins 30c (30c2, 30c3) more reliably.

The shape of the retainer 30c in the embodiment was not specifically defined, and insofar as detachment of the link plate 30a can be prevented, the retainer pin 30c is not limited to any particular shape (such as cylindrical, rectangular parallelepiped, or spherical).

Although attachment of the retainer pin 30c to the outer periphery of the rocker pin 30b by welding was indicated as an example, this is not a limitation and, for example, it is possible to form the retainer pin 30c and rocker pin 30b integrally or to attach the retainer pin 30c by inserting and pressure-fitting it into a hole or the like formed in the outer periphery of the rocker pin 30b.

Japanese Patent Application No. 2014-059722, filed on Mar. 24, 2014, is incorporated by reference herein in its entirety.

While the invention has thus been shown and described with reference to a specific embodiment, it should be noted that the invention is in no way limited to the details of the described arrangements; changes and modifications may be made without departing from the scope of the appended claims.

What is claimed is:

1. A link-plate chain for a continuously variable transmission, comprising:
    a plurality of link plates interconnected in a longitudinal direction and a transverse direction to be wound around an input pulley and an output pulley, the link plates being formed with pin holes;
    a plurality of rocker pins extending in the transverse direction and inserted through the pin holes of the link plates to interconnect the link plates; and
    retainer pins attached at ends in the transverse direction of the rocker pins to prevent detachment of the link plates from the rocker pins, wherein
    the link plates include an outermost link plate placed at an end in the transverse direction and formed with a pin hole,
    the rocker pins include a pair of outside rocker pins and a pair of inside rocker pins inserted through the pin hole of the outermost link plate, the pair of outside rocker pins being placed at both ends of the pin hole in the longitudinal direction, the pair of inside rocker pins being placed inside the pair of outside rocker pins in the longitudinal direction, and
    the retainer pins include outside retainer pins attached to the pair of outside rocker pins facing the outermost link plate and inside retainer pins attached to the pair of inside rocker pins facing the outermost link plate, the inside retainer pins being attached more outward in the transverse direction than the outside retainer pins.

2. The link-plate chain according to claim 1, wherein when the pair of outside rocker pins are defined as first and second rocker pins and the pair of inside rocker pins are defined as third and fourth rocker pins, the inside retainer pins attached to the second and third rocker pins are attached more outward in the transverse direction than the outside retainer pins attached to the first and fourth rocker pins.

3. The link-plate chain according to claim 2, wherein the second and third rocker pins are rockably inserted through the pin hole formed in the outermost link plates.

4. The link-plate chain according to claim 3, wherein the second and third rocker pins are configured to be non-rockable respectively deployed at ends of other link plates adjacent to the outermost link plate in the traverse direction.

5. The link-plate chain according to claim 1, wherein the pair of inside rocker pins contact with the pair of outside rocker pins, and a space is provided between the pair of inside rocker pins.

* * * * *